(12) United States Patent
Jørgensen

(10) Patent No.: US 12,529,626 B2
(45) Date of Patent: Jan. 20, 2026

(54) SAMPLING APPARATUS AND USE OF A SAMPLING APPARATUS

(71) Applicant: Atline ApS, Kolding (DK)

(72) Inventor: Thomas Kniep Jørgensen, Kolding (DK)

(73) Assignee: ATLINE APS, Kolding (DK)

( * ) Notice: Subject to any disclaimer, the term of this patent is extended or adjusted under 35 U.S.C. 154(b) by 273 days.

(21) Appl. No.: 17/824,367

(22) Filed: May 25, 2022

(65) Prior Publication Data

US 2022/0390334 A1 Dec. 8, 2022

(30) Foreign Application Priority Data

Jun. 2, 2021 (DK) .............................. PA 202170286

(51) Int. Cl.
*G01N 1/20* (2006.01)
*G01G 15/00* (2006.01)
*G01G 17/00* (2006.01)
*G01N 9/02* (2006.01)

(52) U.S. Cl.
CPC .............. *G01N 1/20* (2013.01); *G01G 15/00* (2013.01); *G01G 17/00* (2013.01); *G01N 9/02* (2013.01)

(58) Field of Classification Search
CPC ............ G01N 1/20; G01N 9/02; G01G 15/00; G01G 17/00
See application file for complete search history.

(56) References Cited

U.S. PATENT DOCUMENTS

| | | | |
|---|---|---|---|
| 3,802,270 A | 4/1974 | Daniels et al. | |
| 4,024,765 A | 5/1977 | Abonnenc | |
| 4,082,004 A | 4/1978 | Weber et al. | |
| 8,141,418 B2* | 3/2012 | Jorgensen | G01G 17/00 73/149 |
| 9,448,143 B2* | 9/2016 | D'Arienzo | G01N 1/20 |
| 10,627,319 B2 | 4/2020 | Jørgensen et al. | |
| 2018/0372597 A1 | 12/2018 | Olson et al. | |

FOREIGN PATENT DOCUMENTS

DE  10 2006 049 423 A1  4/2008
WO  WO 2009/092378 A2  7/2009

OTHER PUBLICATIONS

Communication and Extended European Search Report (8 pages, Completion Date: Oct. 6, 2022) from corresponding European Application 8 22172941.1.

* cited by examiner

*Primary Examiner* — Kristina M Deherrera
*Assistant Examiner* — Jean F Morello
(74) *Attorney, Agent, or Firm* — Crowell & Moring LLP; John C. Freeman (57) ABSTRACT

A sampling apparatus for sampling from a product flow, wherein the sampling apparatus includes at least one sampling cup having a filling opening, wherein the sampling cup is movably arranged between extracted position and retracted position by an actuator system, wherein the extracted position includes a position for allowing the sampling cup to intersect the product flow. The sampling apparatus further includes a blow system including one or more nozzles arranged to direct a pressurized gaseous medium across the filling opening so as to remove excess sample material extending above the filling opening, while the sampling cup is located in one or more extracted position.

22 Claims, 3 Drawing Sheets

SAMPLING APPARATUS AND USE OF A SAMPLING APPARATUS

This application claims under 35 U.S.C. § 119(a) the benefit of the filing date of Danish Patent Application No. PA 202170286, filed on Jun. 2, 2021, the entire contents of which are incorporated herein by reference.

BACKGROUND OF THE INVENTION

Field of Invention

The invention relates to a sampling apparatus for retrieving a sample for analysis and to a use of a sampling apparatus for collection of pelletized sample material.

Description of Related Art

In a production line in which a product is conveyed, possible heated, extruded, dried or otherwise treated, an extraction of a sample of the product can be transferred for analysis, providing data representing the state of the sample at the point of extraction from the product flow, such as the nutritional and material properties of the sample, e.g., density, temperature, moisture content etc. The production parameters may thereafter be adjusted based on the provided data in order to obtain the desired properties of the product.

For such extraction, a sampling apparatus can be used having an arm with a cavity extending into the product flow and collecting a sample. The arm can then be retracted and the sample can be transferred to a point of analysis. The object of the present invention is to improve such sampling apparatus for collecting sample material, especially pelletized sample material.

Patent document no. WO 2009/092378 A2 describes a sampling apparatus with a sampling cup in which a sample is filled, scraped in level, and weighed. Scraping is provided by a scraper located above the sampling cup. The scraper removes excess material filled in the cup, when the cup is retracted into the sampling apparatus.

Patent document no. U.S. Pat. No. 4,024,765 A describes a sampler with a horizontal cylindrical probe with a recess for sampling a volume of material. The probe is displaceable in and out of a closure member. A rear edge of the recess and/or the nose of the closing member may be provided in a flexible material, such as rubber, in order to avoid crushing the sample material between the rear edge and the nose during retraction.

SUMMARY OF THE INVENTION

In the sampling process, it is a desire to obtain a sample providing an accurate representation of the product conditions and properties within the product flow and sample conditions are therefore to be preserved to the point of analysis, in particular in regards to the original particle, grain or pellet size. It is further a desire to preserve sample conditions after the analysis, such that the sample may be reused, packaged and sold to the consumer.

The present invention provides for a sampling apparatus, which provides an alternative solution to structural obstructions and provides several advantages over such structural obstructions, such as a scraper or flexible nose/rear edge as previously discussed. The alternative solution presented in the present disclosure can push excess material off the sampling cup, without damaging the excess material and the material sampled in the process. The sampling apparatus of the present invention may specifically be arranged to remove any excess sample material that would otherwise collide with the sampling apparatus, e.g. a first pipe section, upon retraction of the sampling cup into the sampling apparatus.

Thus, the present invention relates to a sampling apparatus for sampling from a product flow, wherein the sampling apparatus includes:
- at least one sampling cup including a collection cavity having a filling opening of an extent allowing for sample material to be collected from the product flow and into the collection cavity,
- wherein the sampling cup is movably arranged between extracted position(s) and retracted position(s) by an actuator system, wherein the extracted position(s) includes a first position for allowing the sampling cup to intersect the product flow,
- wherein the sampling apparatus further includes a blow system including one or more nozzle(s) arranged to direct pressurized gaseous medium across the filling opening so as to remove excess sample material extending above the filling opening, while the sampling cup is located in one or more extracted position(s).

In the production of a product, such as a food product, the product may undergo various operations, such as compression, heating, cooling, mixing, extrusion, chemical reaction, transportation or other treatments of the sample, with the aim to produce the desired properties and conditions of the product. In order to optimize the final product it is therefore desirable to control the production parameters based insights on the material at one or more stages of the production line. This is of particular importance in order to provide high reproducibility of the product and in order to provide a product that lives up to standards and product label.

By the present invention, it is possible to collect and analyze a sample without destroying it and thereafter return the sample to the product flow, such that it may be package and sold to the consumer. I.e., the sampled product does not need to be discarded since the sampling apparatus does not cause any damage to the product in the sampling process. This increases production yield, in particular when high sampling rates are applied. This is achieved by the one or more nozzles that may be utilized for removing elements of a particulate or pelletized material that extends beyond the filling opening of the collection cavity before the sampling cup is fully retracted and the filling opening passes a scraper, an edge of the pipe section or conduit from which the sample is collected or the like, which would crush or cut particles or pellets of the sample material extending beyond the filling opening.

Additionally, the prevention of sample damage increases sample correspondence between the sampled and analyzed product and the remainder of the product flow. In order to get reliable readings of the sample material, the sampling process have to be undertaken in an accurate manner. Advantageously, by the present invention, breaking or destroying the sample material collected is avoided, thereby decreasing the possibility of analyzing broken sample parts leading to inaccurate analysis results and potentially unnecessary adjustment of production parameters.

Advantageously, the blow system merely pushes any excess material off the sampling cup and returns it to the product flow without the risk of wedging the sample material, so that it is destroyed. The product flow may be a part of the main production flow or a branched-off line provided for the sampling purpose.

In one or more embodiments, by above the filling opening it is meant above a 2D plane including the filling opening.

The plane may be curved or planar depending on the shape of the collection cup. The blow system may be arranged to wipe off any excess material arranged above the filling opening, such as directly above and arranged on the sampling cup, e.g., on the edges thereof, adjacent to the filling opening.

In extracted position(s), the entire filling opening is preferably exposed to the product flow, such that sample material may fall into the collection cavity. Extracted positions may typically be located outside the sampling apparatus and inside a product flow conduit, e.g., a pipe or shaft. The sampling apparatus may be arranged to be positioned so as to intersect a main flow direction of the product flow. Generally, the main flow direction is meant as the resulting direction of travel of the sample material, such as vertical for free-falling sample material moving in a vertical conduit due to the gravitational force. In one or more embodiments, when the sampling cup is in the first position of the extracted position(s) it is arranged with the filling opening directed substantially against a main flow direction of the product flow, such that the sample material may be collected in the collection cavity.

The blow system is arranged to provide a pressurized gaseous medium across the filling opening while the sampling cup is in one or more extracted position(s). In one or more embodiments, the blow system is arranged to remove the excess material by pushing the excess material by force of the pressurized gaseous medium, e.g., air, so that the excess material is returned back into the product flow. Advantageously, by blowing on the sample material by a pressurized gaseous medium, neither the removed nor collected sample material is damaged and may be packaged and sold. The pressure of the gaseous medium may be adjusted accordingly to provide the desired effect.

In one or more embodiments, the pressurized gaseous medium may be any appropriate gaseous medium, such as an inert gas, however, it may preferably be atmospheric air.

In one or more embodiments, the product flow is provided in a neutral atmosphere at atmospheric pressure, i.e., no additional pressure is added to the product flow environment and the sample product simply moves via gravitational force.

Alternatively, the product flow is provided in a pressurized system, such as a system providing a flow of air or other gaseous medium, to drive the flow.

The blow system is preferably arranged to remove excess sampling material while the sampling cup is moved in a direction from an extracted position to a retracted position, wherein in the retracted position, at least part of the filling opening is shielded from the product flow.

In one or more embodiments, in the retracted position(s) the filling opening is preferably at least partly shielded and typically located partly or fully inside the sampling apparatus, e.g., such that product flow is at least partly or fully prevented from falling directly, i.e., along a substantially vertical path, into the collection cavity of the sampling cup by the force of gravity.

A part of the sampling apparatus may preferably be extending over the filling opening in the retracted position(s).

In one or more embodiments, the sampling cup may be moved in a direction defined from the extracted to the retracted position while the blow system is activated.

Advantageously, the excess material may thereby be removed during positioning of the sampling cup in the retracted position(s) such that sample material is not crushed, broken or wedged or the like which would otherwise most likely be caused by the movement of the sampling cup into covered retracted position. I.e., the risk of collisions between the excess sample material and parts of the sampling apparatus, e.g., shielding of the retracted position(s), is thereby avoided. Additionally or alternatively, the blow system is arranged to blow off access material while the sampling cup is in an extracted position, such as static in an extracted position, such as in the first position.

In one or more embodiments, the blow system includes a plurality of nozzles arranged so as to form a line of nozzles, such as between 2-20 nozzles, such as between 3-15 nozzles, preferably between 5-12 nozzles. Advantageously, increasing the amount of nozzles in turn increases the flexibility in design of the resulting extent, shape, and/or intensity of the gaseous medium. The nozzle(s) may preferably include a substantially round exit opening, however, the nozzle may alternatively be shaped as having an elongated opening, such as a slit. In an embodiment, the sampling apparatus includes a nozzle shaped as a slit, so as to provide a sheet of pressurized gaseous medium directed across the filling opening.

In one or more embodiments, the position of the nozzle(s) in the sampling apparatus is provided so that the nozzles can provide gaseous medium over the filling opening so as to wipe off excess sample material, when the sampling cup is in extracted position(s), e.g., the nozzle(s) are preferably arranged above the filling opening, and optionally so that the nozzles are not obstructing the product flow, e.g., preferably outside the product flow. The exit opening(s) of the nozzle(s) may be facing the outside environment surrounding the apparatus, e.g., provide a part of an external boundary of the sampling apparatus, and not be contained inside the sampling apparatus.

In one or more embodiments, the blow system is arranged to provide the pressurized gaseous medium such that substantially the entire extent of the filling opening is covered by the pressurized gaseous medium. Advantageously, this allows removal of excess material at all locations of the filling opening.

In one or more embodiments, the blow system is arranged to provide the pressurized gaseous medium in a shape substantially corresponding to the shape of the filling opening, however, typically of larger major extent than the filling opening.

The one or more nozzle(s) of the blow system may be configured to provide the pressurized gaseous medium as a sheet of gaseous medium extending across the filling opening.

Advantageously, by the sheet of gaseous medium, the entire filling opening may be more readily wiped-off excess sample material. The medium will be able to effectively affect any type of sample material, in particular pellets or pills, and excess sample material not fully enclosed in the collection cavity, will be pushed off.

By a sheet it is meant that it is of a larger major extent, the major extent typically being the width of the sheet, than of a minor extent, the minor extent being the thickness of the sheet typically measured along a direction being perpendicular to the plane of the filling opening. A sheet of pressurized gaseous medium is also typically referred to as a curtain, wipe or knife of gaseous medium, e.g., an air knife, air curtain, or air wipe.

In one or more embodiments, the sheet may be provided by a plurality of nozzles arranged in a line or array, or alternatively a single nozzle, e.g., slit nozzle.

In one or more embodiments, the sheet of gaseous medium is provided as a uniform sheet of laminar flow, e.g., airflow.

In one or more embodiments, the gaseous medium is provided by a source of pressurized gaseous medium or compressed gaseous medium, such as air or nitrogen.

In one or more embodiments, the gaseous medium is pressurized by a compressor system including a compressor arranged to compress a gaseous medium from a gaseous medium source. The compressor system may be adjustable either manually, automatically, or both to deliver suitable gaseous media volume and velocity out through the nozzle(s), depending on application, e.g., sample type.

In one or more embodiments, the sampling apparatus is arranged to be connected to a conduit in which the product flow is moving, wherein the conduit may be of any shape or size. The conduit may be of any transverse cross-sectional shape, such as round, oval, or rectangular and arranged with an interior conduit space in which the sample material travels. The conduit wall may be made up of one or more wall sections. Preferably, the longitudinal extent of the conduit is arranged vertically, and the product flow is displaced therein by applied gravitational force.

The sampling apparatus may furthermore include a first pipe section arranged to be installed through a conduit wall of a conduit including the product flow, and wherein the first pipe section includes the one or more nozzle(s) arranged in an end wall surface thereof.

The first pipe section may not only provide structural connection between the conduit and the sampling apparatus but also provide a housing in which the sampling cup may be displaced. In one or more embodiments, the first pipe section may include one or more walls enclosing a hollow interior in which the sampling cup can be displaced between extracted and retracted positions. It is generally understood, that the first pipe section may include any transverse cross-sectional outer shape, e.g., round, rectangular etc.

In one or more embodiments, the blow system may be arranged to remove any excess sample material extending above a fill height, which is substantially equal to a gap height of a gap existing between the filling opening and the first pipe section, when the filling opening is arranged inside the first pipe section, e.g., moved there through. I.e., the blow system may be arranged to remove excess sample material, which would otherwise collide with the first pipe section during retraction of the sampling cup.

In one or more embodiments, the first pipe section may be provided by a single structure or a layered structure, e.g., the first pipe section may include an inner pipe section defining an inner pipe section space in which the sampling cup can be displaced and the first pipe section may additionally include one or more outer pipe sections, concentric with the inner pipe section and including the one or more nozzle(s). Optionally, the different pipe sections may have different longitudinal lengths.

In one or more embodiments, the conduit in which the product flow is moving may be of any shape or size. The conduit may be of any transverse cross-sectional shape, such as round, oval, or rectangular, and arranged with an interior conduit space in which the sample material travels. The conduit wall may be made up of one or more wall sections, providing an interior wall surface facing the interior conduit space and an outer wall surface facing the outside environment. Preferably, the longitudinal extent of the conduit is arranged vertically, and the product flow is displaced therein by applied gravitational force.

In one or more embodiments, the wall(s) of the first pipe section may include an end wall surface directed towards the interior of the product flow conduit, which may be curved, tapered and/or perpendicular to the longitudinal extent of the first pipe section. The end wall surface may additionally include the one or more nozzle(s). Preferably, a portion of the end wall surface being located above the filling opening includes the nozzle(s), so that gaseous medium can blow over the filling opening and wipe of excess sample material.

The sampling apparatus is advantageously configured to be installed so that the end wall surface, such as at least the end wall surface including the nozzle(s), is not extending beyond an interior wall surface of the conduit, such as substantially flush with the interior surface of a conduit wall adjacent to the end wall surface.

By the embodiment, the end wall surface may preferably be arranged to be located behind the interior surface of the conduit, and not beyond the interior wall surface and into the interior conduit space after installation. This potentially minimizes the amount of pipe section material extending into the interior space of the conduit and potentially interfering with the product flow after installation of the sampling apparatus.

In a preferred embodiment, the end wall surface may be flush with the interior wall surface of the conduit. Advantageously, a substantially levelled interior surface transition may be established across the interfaces between the neighboring interior surface of the conduit wall and the surface of the end wall surface, e.g., such that the end wall surface in effect substantially provides a continuation of the surface curvature of the interior conduit wall, substantially matching the removed conduit wall at the conduit opening through which the sampling apparatus is installed. The flush arrangement may be provided for any shape of the conduit, i.e., the end wall surface and the first pipe section may be shaped to provide the mentioned effect.

In one or more embodiments, the end wall surface extents substantially perpendicular to the general flow direction of the product flow. Typically, the end wall surface extends perpendicular to the longitudinal extent of the pipe section.

In one or more embodiments, the end wall surface is curved, preferably such that the end wall surface has a surface curvature arranged to provide an approximate continuation of a surface curvature of conduit of a round or oval transverse cross-section, when the pipe section is installed in the conduit. Moreover, the curved end wall surface may additionally include the nozzle(s) and may additionally provide an effective removal of excess sample material by the blow off effect.

In one or more embodiments, the blow system is arranged to direct pressurized gaseous medium across the filling opening an into the collection cavity at angle of at least 3 degrees, preferably at least 5 degrees or more preferably at least 7.5 degrees, wherein the angle is measured relative to the filling opening.

In one or more embodiments, the blow system is arranged to direct pressurized gaseous medium across the filling opening and into the collection cavity at angle below 20 degrees, preferably below 18 degrees, or more preferably below 15 degrees, wherein the angle is measured relative to the filling opening.

The blow system is preferably arranged to direct pressurized gaseous medium across the filling opening and into the collection cavity at an angle of between 3 and 20 degrees, such as between 5 and 18 degrees, preferably between 7 and 15 degrees, wherein the angle is measured relative to the filling opening.

Advantageously, by angled flow of pressurized gaseous medium, the blow system may both remove excess sample material and aid in keeping collected sample material, extending below the filling opening, inside the collection cavity. This effect is in particular seen with sample material being pellets or pills, e.g., coffee beans, cereal, dog food, or other similar sample material types.

The angle is measured in a plane orientated perpendicular to a plane including the filling opening extent. In case of a curved filling opening, the filling opening plane is also curved. In one or more embodiments, the nozzle may be angled so as to provide the angled flow of gaseous medium towards the filling opening.

In one or more embodiments, the sampling cup is arranged to be movable through an interior space of the pipe section, between extracted and retracted positions. The pipe section may include a pipe section aperture surrounded by the end wall surface and the sampling cup may be movable through the pipe section aperture of the first pipe section, e.g., so as to move the sampling cup to the first position, in which the sampling cup is positioned beyond the end wall surface of the pipe section.

In one or more embodiments, the sampling cup is fixed to a movable arm, being movable by the actuator system including an actuator motor, such as a pneumatic or hydraulic motor or electric motor. In one or more embodiments, the movable arm may be an elongated arm being arranged to be displaceable along a longitudinal direction thereof, so that the sampling cup can be displaced between the extracted and retracted position(s), e.g., provided along a line parallel to the longitudinal direction of the elongated arm.

In one or more embodiments, the movable arm is arranged to be rotatable about a longitudinal axis thereof, such that the filling opening may be positioned at different radial positions about the longitudinal axis, e.g., such that the content of the sampling cup may be emptied or the filling opening may collect sample material in an angled conduit.

Advantageously, by the movable arm the sampling cup may extract and displace sample material, e.g., pellets, through the first pipe section to locations exterior to the conduits, where it may be further processed or analyzed, e.g., by an analysis system.

The sampling cup may be arranged on an elongated arm of the actuator system, wherein the elongated arm is configured to be displaceable along a longitudinal direction thereof, so that the sampling cup can be displaced between extracted and a retracted positions, and wherein the retracted positions includes an analysis position, which is located within an analysis chamber of an analysis system included by the sampling apparatus and configured to determine a material property, such as the bulk density, of the sample material in the sampling cup.

By the present embodiments of the invention, the sampling cup may be displaced to an analysis position, in which the collected sample material may be examined. The results associated with the analysis may be presented to the user, e.g., at a user interface and/or used in the control of the production process of the product. This may be provided by the analysis system, e.g., in communication with the control system of the production line. E.g., a bulk density [g/l] of the sample material in the collection cavity may be determined and the result may be processed by a processing unit and utilized in controlling an earlier part of the production process, such as the pressure provided in the extruder at an extruder die and/or the heating provided.

Bulk density can typically be a product property to survey in order to lower product variability and to obtain and maintain a specific quality of the end product living up to product labels, product packaging, expected product behavior, and/or as agreed with the customer.

In one or more embodiments, the analysis system may preferably be integrated in the sampling apparatus. Advantageously, this allows for a stand-alone solution, for quick and efficient collection and analysis of the sample material, thereby providing an accurate estimate of the sample properties of the sample material within the product flow, which information may be used to control process parameters of the production of the product.

In one or more embodiment, the sampling apparatus does not include the analysis system in that any analysis on the sample may be conducted externally to the sampling apparatus, e.g., at a different location.

The analysis chamber is advantageously provided externally to the product flow.

The analysis is done on collected sample material and not directly on the product flow. However, by the present invention, the collected and possibly analyzed material may subsequently be returned to the product flow.

The analysis system may include one or more of the following instruments:
  a scanning device, such as a vision camera, e.g. a color camera,
  a sensor device, such as a temperature sensor and/or a fill level sensor,
  an ultra-violet (UV) radiation unit,
  a weighing unit for weighing the content of the collection cavity.

In one or more embodiments, the analysis system is configured to determine one or more of the following properties of the sample material in the sampling cup: color, shine, volume, weight, bulk density, and/or temperature. Aesthetic features may be determined by the scanning device, being an optical or ultrasound device, e.g., the appearance of the content of the sampling cup may be determined by a vision camera.

In one or more embodiments, a weighing unit may be arranged in connection with the sampling cup, such as in connection with the movable arm, and be arranged to determine the weight of the content of the sampling cup. In one or more embodiments, the weighing unit may include one or more load cell(s). The analysis system preferably includes one or more fill level sensor(s) for detecting when the fill level used for determining the volume of the sample material in the collection cavity. The fill level sensor may include one or more photocell system(s).

A bulk density of the sample material may be determined by using the determined weight and volume measurements. The weighing unit may include one or more weight sensors, such as a load cell, scale or strain gauge. In one or more embodiments, the analysis system includes at least a fill level sensor, such as one or more fill level sensors, and a weighing unit.

In one or more embodiments, a temperature of sample material collected in the sampling cup may be determined by a temperature sensor included in the analysis system.

In one or more embodiments, the analysis system is configured to provide sterilization of the sampling cup and sample material by ultra-violet irradiation by the ultra-violet radiation unit. The ultra-violet radiation unit may include one or more ultra-violet radiation sources, such as two, three or preferably four irradiation sources. In one or more embodiments, the radiation source is arranged to provide far ultra-violet radiation (UV-C) of wavelengths approximately between 200 and 280 nm. Advantageously, the UV-C sources can be employed as germicidal lamps by inactivation of microorganisms by UV-C irradiation.

In one or more embodiments, at least one of the instrument(s), preferably all of the instruments except the weighing unit, are provided in a hood of the analysis system, which may be displaceable and disconnected so that the analysis system can be accessed from the outside, e.g. for inspection. The disconnection may be provided by a clamp system, e.g. a clamping ring connecting the hood with the remainder of the sampling apparatus, however any other suitable connection may be provided.

In one or more embodiments, the analysis system may optionally include an aeration device including one or more fans, for providing a flow of air to the sample material arranged in the collection cup in the second position. The analysis chamber may be provided with a side opening provided with a door, which when open, can provide an outlet for air inside the chamber to the outside of the chamber. Suction means may be connected to the side opening, such that gaseous medium, e.g., air or steam, may be forced out through the side opening.

Advantageously, this allow for providing improved conditions within the chamber in order to increase the precision and accuracy of the examinations undertaken therein, by the instrument(s) of the analysis system. Advantageously, a flow of air or steam may be provided from the top of the chamber, by the fans to a side of the chamber by the side opening. The analysis chamber may be provided with one or more side openings arranged around the chamber and the sampling cup when in the second position.

One or more instrument(s) of the analysis system may advantageously be arranged to be located above the sampling cup, when the sampling cup is in the analysis position, and wherein the analysis system includes a wall segment movably fixed to an interior surface of the analysis chamber, such that the wall segment is arranged to at least partly shield a measuring space extending between the sampling cup and the instruments.

The wall segment is preferably a structural element, which provides a physical shield for the collected sample material. The wall segment may extend from the sampling cup, e.g. at least from the plane including the filling opening to the instrument(s), e.g., sensors, scanning devices or radiation unit, etc. The wall segment may preferably be arranged to provide a shield between the measuring space and the interior of the conduit, optionally also an interior part of the first pipe section, such that the analysis process in unaffected by disturbances that may be introduced from the interior of the conduit, e.g., through the first pipe section.

The wall segment may, in one or more embodiments, be movably fixed to an upper interior surface of the analysis chamber, e.g., adjacent the instrument(s) and arranged to a distance about the instrument(s). Alternatively, the wall segment may be movably fixed to other parts of the analysis chamber, e.g., a side or bottom surface.

In one or more embodiments, the wall segment may be movable to and from a closed position, in which the closed position the wall segment closes off the measuring space at least from the interior of the conduit. The wall segment may be moved to an open position, when the shielding effect is not needed, e.g. when the movable arm is moving the sampling cup. Preferably, the open position allows such movement of the sampling cup in and out of the measuring space of the analysis chamber.

The wall segment may be configured to be movable about the measuring space along a distance corresponding to an angle of at least 75 degrees, more preferably at least 90 degrees, from a closed position in which the wall segment provides a shield between the product flow and the sampling cup.

By the rotatable wall segment, about the measuring space, a space saving solution may be provided where the wall segment may be more readily contained within the analysis chamber, instead of having to provide more space for stowing away the wall segment. In particular, since the wall segment may be moved along a curved pathway instead of a linear pathway. The angle of rotation may be measured about an axis extending substantially vertical through the measuring space.

The sampling apparatus may alternatively or additionally include a gate device including a slide gate with a major extent thereof arranged perpendicular to a longitudinal extent of the interior pipe space of the first pipe section, and wherein the slide gate is arranged to be displaceable between an open position and closed position, wherein in the closed position the slide gate is arranged to close the interior pipe space by extending across the transverse extent of the interior pipe space of the first pipe section.

Advantageously, the slide gate may provide a shield between the measuring space and the interior of the conduit, such that the analysis process is unaffected by disturbances that may be introduced from the interior of the conduit. The slide gate may be arranged at any position along the first pipe section, however, preferably near the end wall surface facing the product flow. The slide gate is preferably a structural element, which provides a physical shield for the collected sample material.

In one or more embodiments, the slide gate may be displaceable through a slit opening in the pipe section, and further be enclosed by a casing mounted on an outer surface of the pipe section, when the slide gate is in the open position. In the open position, at least a majority of the major extent of the slide gate may be arranged outside the interior pipe space.

In one or more embodiments, the sampling apparatus may include both the slide gate and the wall segment or it may include only one of the options.

The sampling apparatus may furthermore include a shaft for receiving sample material from the collection cavity, wherein the shaft is arranged externally to the product flow.

The shaft may be arranged to direct the sample material to a further analysis system, such as an analysis system arranged for conducting near infrared analysis on the sample material. Alternatively, the shaft may be arranged for disposal of the sample material, for packaging it into bags and/or for reintroducing the sample material into the production line. The shaft allows for emptying the sampling cup in retracted position, preventing the need to reintroducing the sampling cup in the extracted positions, e.g., inside the product flow. It may thereby introduce fewer interruptions to the product line.

In one or more embodiments, the content of the collection cavity may be emptied into the shaft either by a rotatable arm on which the sampling cup is mounted or by providing the sampling cup with a movable door, which may be arranged to be displaceable so at to provide a discharge opening through which the content may fall into the shaft.

In one or more embodiments, the sampling cup includes a discharge opening, arranged approximately opposite the filling opening and provided with a movable door. The movable door may be arranged to be displaceable between an open and closed configuration, wherein in the open configuration sample material is allowed to be discharged from the collection cavity through the discharge opening and wherein in the closed configuration, the door may provide a bottom side of the collection cavity and prevent discharge of sample material through the discharge opening. In one or more embodiments, the door may be arranged to pivot or to slide to and from the open and closed configurations. The discharge opening is preferably arranged opposite the filling opening, such that when the sampling cup is oriented with the filling opening directed upwards, in a position for collection of sample material, the discharge opening is directed downwards, e.g., for discharge of sample material by gravitational force, when the open configuration is employed.

In one or more embodiments, the sampling cup is arranged to contain and store a volume of sample material inside the collection cavity of the sampling cup. The shape of the collection cavity may be any shape suitable for that purpose. The sampling cup is preferably not provided with a lid, which can cover the filling opening. The extent and shape of the filling opening may be of any suitable shape and extent to allow for passage of sample material. In one or more embodiments, the surface of the sampling cup, extending adjacent the filling opening preferably has a surface shape on which sample material cannot readily settle, aggregate and/or stick to in order to aid in the removal of excess sample material. E.g., upward facing surfaces of the sampling cup, e.g., in the extracted positions, may be rounded so as to allow the sample material to roll off on its own by the gravitational force.

In one or more embodiments, the sampling cup is provided by an elongated rod, in which a collection cavity is provided. Alternatively, the sampling cup may be fixed onto a rod, e.g., at an end of the rod. If the rod is to be introduced in the product flow with the sampling cup it is preferable that it has a surface shape on which sample material cannot readily settle, aggregate and/or stick to, optionally also a uniform surface shape. The transverse cross-sectional shape of the rod may be of any shape, however preferably a round or oval cross-sectional shape. The rod may simultaneously provide the arm movable by the actuator system.

In one or more embodiments, the collection cavity can contain between 500 ml and 2000 ml, such as about 1000 ml of sample material.

The collection cavity may in a particular embodiment include two discrete sampling cavities, such that two separate portions of sample material may be collected simultaneously.

Advantageously, two separate analyzes may be undertaken for the two sample material collections and/or one sample material collected may be displaced through the discharge opening while the other remains in the cup and may later be displaced through the same opening or by other ways as explained in the present disclosure.

In one or more embodiments, the sampling apparatus is arranged to sample material including individual elements, such as pellets. The sampling apparatus is preferably arranged to collect and/or analyze elements of a size, i.e., width, length, and thickness, below 50 mm, such as below 40 mm, preferably below 35 mm. In one or more embodiments, the sampling cup is arranged to collect elements of a width, length, and thickness above 0.2 mm, such as above 0.4 mm, such as above 2 mm, preferably above 5 mm. In one or more embodiments, the size of the elements are between 0.2 mm and 50 mm, such as between 0.3 mm and 40 mm, preferably between 0.4 mm and 35 mm, more preferably between 2 mm to 25 mm, in particular between 5 mm to 20 mm.

The sampling apparatus may in particular be suitable for sampling food products, e.g.. pet food, fish, food, etc.

In one or more embodiments, the sampling apparatus is arranged for continuous collection of the sample material. Further, the sampling apparatus may be arranged for associated continuous analysis of the collected sample material. The process may be fully or partially automated. Preferably, human intervention is limited or avoided in order to increase the repeatability and quality of the sampling by the sampling apparatus.

In one or more embodiments, the sampling apparatus includes a control system arranged to control one or more parts of the sampling apparatus. The control system may be arranged to control the displacement of the movably arranged sampling cup between the first position and second position, and may further or alternatively be arranged to control the blow system such that a sheet of compressed air is provided in order to blow off sample material extending above the filling opening. In one or more embodiments, the control system may be arranged to control the displacement of the sampling cup based on a signal provided by a fill level sensor detecting the fill level of the sampling material in the collection cavity. In one or more embodiments, the fill levels sensor is arranged to provide the signal when a pre-selected level has been reached by the sampling material in the collection cavity, e.g., such as when the collection cavity is full. Advantageously, the pre-selected fill level corresponds to a specific volume, which may be readily used in bulk density calculations.

The sampling apparatus preferably also includes a control system for controlling the blow system and the displacement of the movably arranged sampling cup between extracted and retracted position(s), such that upon receiving an activation input, the control system is arranged to execute a sampling process including the steps of.

providing the sampling cup in an extracted position,
initiating a wipe off process by the blow system so as to remove excess sample material located above the filling opening, and
providing the sampling cup in a retracted position.

In one or more embodiments, the step of providing the sampling cup in a retracted position is initiated subsequently to the initiating the blow system. The blow system may be removing excess sample material prior to and/or while the sampling cup is being retracted.

In one or more embodiments, the control system is further arranged to control the analysis system, so as to activate the analysis system in order to conduct analysis on the sample material collected in the sampling cup. In one or more embodiments, the activation of the analysis system is included in the sampling process. In one or more embodiments, the sampling cup is placed in an analysis position of the retracted position(s).

In one or more embodiments, the control system is arranged to provide an automatic execution of the sampling process, e.g., in a continuous manner. The continuity may be pre-set according to input from the user or by the control system, e.g., based on analysis results, sample type, etc., execute the sampling process at least three consecutive times.

The control system may in particular be arranged to control the sampling apparatus, such that a sampling process is executed periodically, such as every minute, or every 30 seconds, preferably, every 15 seconds.

In one or more embodiments, the time intervals for the period may be pre-set according to input from the user, e.g., via user interface, or by the control system, e.g. based on analysis results, sample type etc. The control system may include a processing unit for processing automatically or manually generating inputs containing analysis results and/or inputs from the user, e.g., sample type, and control the production of the product based thereon.

By the present invention, the control system is arranged to provide an automatic and periodic surveillance of the physical conditions of the product flow and in particular, the material properties, such as bulk density of the product flow.

In one or more embodiments, the sampling apparatus includes a cleaner for cleaning the collection cavity of the sampling cup, wherein the cleaner includes one or more outlet for providing a fluid and/or gas for cleaning the collection cavity. The cleaner may additionally or alternatively including mechanical structure for cleaning the collection cavity, such as a brush. The cleaner may be arranged with outlet(s) provided below the collection cavity when the collection cavity is arranged in an extracted position, e.g., a first position inside the product flow. The outlet(s) may be included in pipes(s) of the cleaner extending inside the conduit containing the product flow, such as pipes fixed to the first pipe section and directed inside the product flow conduit.

In particular, when a sticky, and possibly hot, sample material, such as pet food, is collected in the collection cavity, it is preferable that the sample apparatus includes a cleaner for cleaning the collection cavity. The sample material may have a tendency to adhere to the interior surfaces of the collection cavity, especially if cooled, and thereby be maintained therein even after a rotation of the cup for emptying the cup, which in turn may lead to faulty subsequent analysis results. This disadvantageous effect may be avoided by the provided cleaner.

In making a food product of pelletized sample material, the production process typically begins with providing a dough of raw dry and wet ingredients mixed together, which is fed to an expander, which uses pressurized steam and/or hot water to cook the dough under potentially extreme pressure and high temperatures. The dough is then forced - or extruded —through a die with holes of selected size and shape and cut into suitable lengths. This process is typically undertaken while the dough is still compacted from the high pressure, and before the dough pieces preferably expand and puff up. The dough pieces are thereafter dried and moisture is withdrawn, so as to produce the pelletized sample material, such as kibble. Optionally, the sample material may be subsequently sprayed with fats, oils, minerals, and vitamins, and sealed in packages before the fats and oils can spoil. The pelletized sample material is preferably cooled before packaging and storage.

The second aspect of the invention relates to a use of the sampling apparatus according to any of the embodiments according to the first aspect of the invention.

The present invention also relates to the use of the sampling apparatus disclosed herein for collection of sample material from a product flow, wherein the product flow provides a food product, and wherein the product flow includes material arranged to provide said food product after undergoing at least an extrusion process, drying process and cooling process, and wherein the sampling apparatus is arranged to collect a sample material from the product flow prior to the extrusion process, prior to the drying process and/or prior or post to the cooling process.

Advantageously, by the present invention, the blow system allows for removal and prevention of sample entrapment and, thereby, sample damages. In particular for soft sticky samples, entrapment or collision with the sample material may not only cause damage to the product, making it harder to sell, but may also contaminate and cause sample material aggregation inside the sampling apparatus, thereby potentially increasing cleaning and maintenance needs. By the blow of system the sample material is blown back into the product flow before such entrapment or collision can occur, e.g., with the first pipe section. Advantageously, by the present invention, the sampling apparatus may be used with sample material in a wide range of sample conditions such as wet and dry, warm and cold and/or hard and soft sample material, etc.

In one or more embodiments, the product flow may contain a finished or an intermediate product. It is generally understood that the product flow may be sampled at a location on a production line for making the food product.

The third aspect of the invention relates to a use of a sampling apparatus for collection of pelletized sample material.

The sample material may in particular be a pelletized sample material of a size having the largest dimension of a length of in the range of 0.4 mm to 35 mm, such as in the range of 2 mm to 25 mm, in particular in the range of 5 mm to 20 mm, wherein the sampling apparatus includes:
at least one sampling cup including a collection cavity having a filling opening of an extent allowing for sample material to be collected from the product flow and into the collection cavity,
wherein the sampling cup is movably arranged between extracted position(s) and retracted position(s) by an actuator system, wherein the extracted position(s) includes a first position for allowing the sampling cup to intersect the product flow,
wherein the sampling apparatus further includes a blow system including one or more nozzle(s) arranged to direct pressurized gaseous medium across the filling opening so as to remove excess sample material extending above the filling opening, while the sampling cup is located in one or more extracted position(s).

Advantageously, by the present invention, the blow system pushes off excess sample material and, thereby, potentially completely wipes the sampling cup at the filling opening in order to avoid damaging the sampling apparatus and excess sample material as the sampling cup is moved out of the product flow. The blow system makes it possible to use the sampling apparatus with sample material in a wide range of sample conditions such as wet and dry, warm and cold and/or hard and soft sample material etc. since no mechanical structure needs to interact with the excess sample material which may cause the sample material to be crushed and potentially trapped. In one or more embodiments, the blow system may be adjustable such that the blow off force provided by blow system through the gaseous medium may adjusted depending on sample type and condition.

In one or more embodiments, the product flow may contain a finished or an intermediate product. It is generally understood that the product flow may be sampled at a location on a production line, wherein the production line, e.g., it may have station(s) for undertaking the extrusion process, drying process, and cooling process or other processes changing the condition, and/or material property of the sample. E.g., sampling apparatus may be used prior to an extrusion process, prior to a drying process, and/or prior or after a cooling process.

In one or more embodiments of the second or third aspect, the use of the sampling apparatus further provides for analyzation of the collected sample material by an analyzing apparatus, as previously mentioned in relation to the first aspect, preferably included in the sampling apparatus. The use of the sampling apparatus may relate to collection and subsequent analyzation of the sample material. As an example, the analysis apparatus may be arranged to determine the bulk density by a weighing scale connected to the movable arm holding the sampling cup, so as to determine a weight of the collected sample material, and a fill level sensor for determining the volume collected.

In one or more embodiments of the second or third aspect, e.g., subsequent to the analyzation by the analysis apparatus, the sample apparatus may be arranged to transfer the sampling material for disposal and/or further analysis external to the sampling apparatus, e.g., NIR analysis, by a movable arm and an actuator system included in the sampling apparatus as previously described in relation to the first aspect of the invention. The sampling apparatus may thereby be used to convey the collected sample material through the sampling apparatus and to a location external to the sampling apparatus.

In one or more embodiments, after emptying the sampling cup, the sampling apparatus may be irradiated with UV-C radiation in order to sterilize the sampling cup and any leftover sample material.

In one or more embodiments, the blow system is arranged to direct pressurized gaseous medium across the filling opening at angle of between 3 and 20 degrees, such as between 5 and 18 degrees, preferably between 7 and 15 degrees, wherein the angle is measured relative to the filling opening. This may in particular be advantageous for pelletized sample material, as the sample material in the collection cup will be maintained in the cup by the gaseous medium pressing the pellets towards the walls of the cup, while the excess sample material will be exposed enough to be blown away.

In one or more embodiments, the sample apparatus includes any of the features and associated benefits described in relation to the first aspect and/or second aspect of the invention.

In one or more embodiments of the first and/or second and/or third aspects of the invention, the sampling apparatus may be used in different industries, such as in agricultural, food and chemical industries in which material are physically and/or chemically treated to provide a product. The sampling material may be in the form of pellets, grains, powder, flour, flakes, beans, etc.

The production of food products, such as pellets for animals, typically involves operations providing high temperature and extrusion/compacting/compression of the product material. The properties of the final product, such as moisture content, size, density and/or texture, may be changed by changing the production parameters of these operations. Due to the production process and nature of the food product, the product to be sampled are pelletized, which works well with the blow system solution, whereby excess material readily can be displaced, without blowing out sample material located below the filling opening of the cup.

In one or more embodiments of the first and/or second and/or third aspects of the invention, the pelletized sample material may be animal food, such as animal kibble. The kibble may be in any shape or form, such as square, oval, round or shape as a fish, or the like. Pelletized sample material may also be animal cakes or biscuits.

BRIEF DESCRIPTION OF DRAWINGS

Aspects of the present disclosure will be described in the following with reference to the figures in which:

FIG. 5 shows instruments of an analysis system of the sampling apparatus of FIGS. 1-3, seen in perspective.

DETAILED DESCRIPTION OF THE INVENTION

Figure 1:
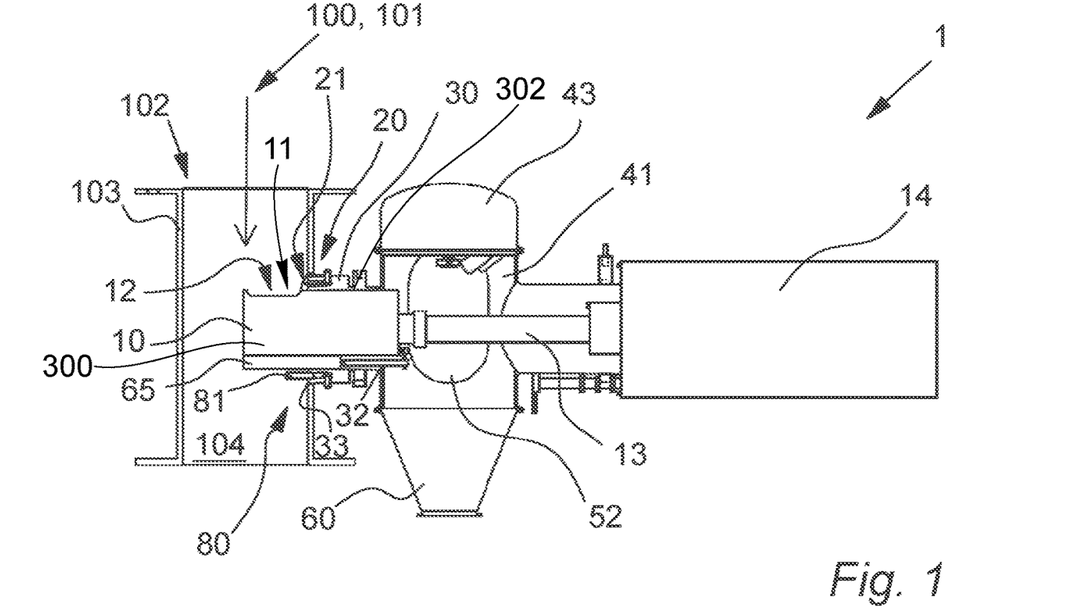
FIG. 1 shows an embodiment of a sampling apparatus according to an embodiment of the invention and a conduit, seen from the side with a side part of the sample apparatus and conduit removed and with the sampling cup in an extracted position in accordance with the present invention.

FIG. 1 shows a sampling apparatus 1, installed through a conduit wall 103 of a conduit 102, where half of the side parts of the sampling apparatus 1 and the conduit has been disguised to show the interior of the sampling apparatus 1 and conduit 102. In the present example, the part of the conduit at which the sampling apparatus 1 is installed is extending substantially along a vertical axis, while the sampling apparatus 1 is orientated substantially along the horizontal axis, such that the sampling cup 10 is arranged to be movable substantially along the horizontal axis. The conduit 102 may be a part of a production line, e.g., for making pellets, and the product being displaced within the conduit 102 may be displaced by gravity. The flow direction of the product flow is vertical as indicated by in FIG. 1.

The sampling cup 10 includes a filling opening 12 allowing for access to a collection cavity 11 of the sampling cup 10 located below the filling opening 12. The sampling cup 10 is fixed to an elongated arm 13, which is movable along the longitudinal axis of the arm 13, thereby allowing for the sampling cup 10 to be moved in and out of the sampling apparatus 1. In the present example, the sampling cup 10 is provided in a cylindrical body, however other ways of establishing a sampling cup 10 may be provided, e.g., a rectangular body, etc. The extended length of the cylindrical body beyond the filling opening 12 (towards the interior of the sampling apparatus 1) is optional, however it may aid in preventing unwanted foreign material, e.g., sample material to enter into the sampling apparatus 1. The curved outermost surface of the cylindrical body has provided sloped walls, which can aid in allowing excess sample material to fall off and remain in the conduit 102. As shown in FIGS. 1-3 and 4a-c, the sampling cup 10 has a body 300 that defines the collection cavity 11, wherein a first side 302 of the body 300 defines the filling opening 12 that allows the sample material to be collected within the collection cavity 11 upon an inner surface portion 304 of the body 300 that faces the filling opening 12, wherein the filling opening 12 and the inner surface portion 304 move in unison at all times.

The sampling apparatus 1 includes a first pipe section 30 arranged to surround the sampling cup 10 and in which the sampling cup 10 may be displaced, when travelling between extracted and retracted position(s). In the present examples, the first pipe section 30 provides a sleeve with a longitudinal aperture being co-axial with the cylindrical body of the sampling cup 10. Typically, the transverse cross-sectional extent allows a minimum sized gap to exist between the sampling cup 10, in particular the filling opening 12, and the first pipe section 30.

The first pipe section 30 further surrounds at least a part of a blow system 20 having a plurality of nozzles 21 arranged through an end wall surface of the first pipe section 31. The nozzles 21 are shown as being located in a top part of the end wall surface 31, above and adjacent the filling opening 12, when the sampling cup 10 is in an extracted position, as shown in FIG. 1. The blow system 20 may be installed as a separate part, e.g., constituting a retrofitted part, which may be attached to the first pipe section 30. The nozzles 21 may be in fluid connection with a source of gaseous medium 22, e.g., air, which is preferably pressurized, e.g. by a compressor, so as to provide a flow of pressurized gaseous medium 22 out through the nozzles 21, preferably in a controlled direction determined by the arrangement and orientation of the nozzles 21.

Figure 2:
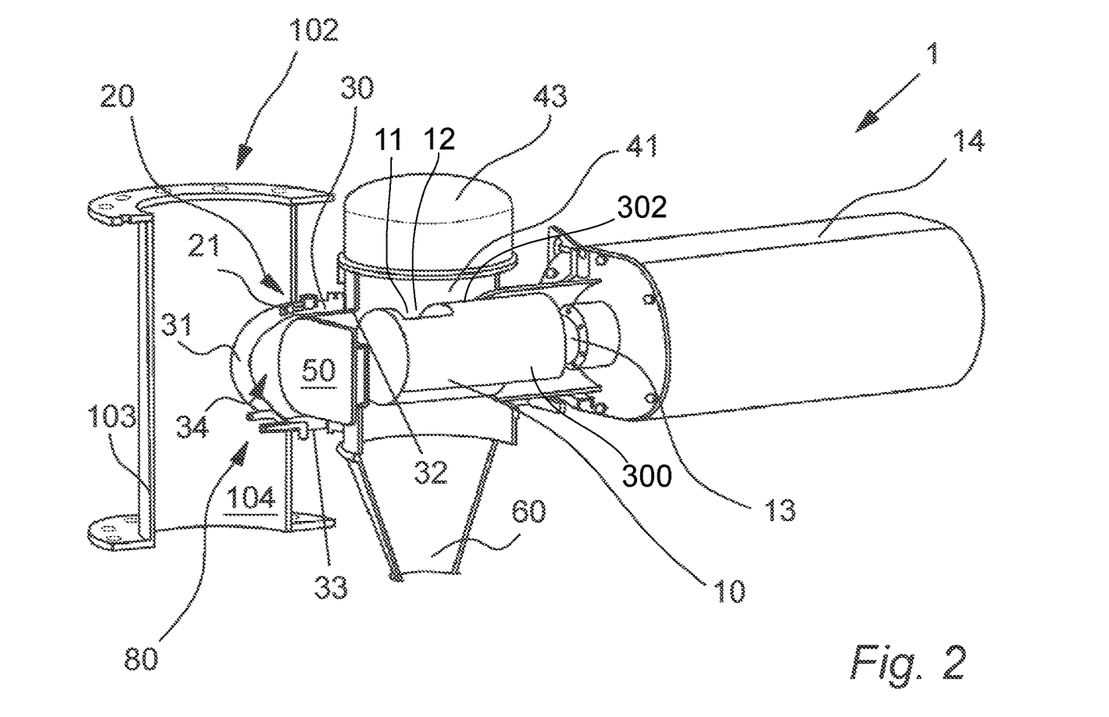
FIG. 2 shows the sampling apparatus and conduit of FIG. 1 seen in perspective, with the sampling cup in a retracted position.

In the present examples, an interior pipe space 34 of the first pipe section 30, e.g., a longitudinal aperture, provides for displacement between the first position, in which the sampling cup 10 can collect sample material from a product flow located inside the conduit 102 (see FIG. 1) and a second position inside the sampling apparatus 1, where the sampling cup 10 is retracted (see FIG. 2). A driver is provided to drive the displacement of the elongated arm 13, at least along a longitudinal extent of the arm 31 but optionally also about the longitudinal extent of the arm 31. The longitudinal extent of the arm 31 is in the present examples located in the horizontal plane. The driver may be mechanical, electrical, hydraulic or pneumatic and may preferably be stored arranged inside the housing 14.

FIG. 2 shows the sampling apparatus 1 and conduit 102 of FIG. 1, also seen from the side but from a different perspective. In the present view, the end wall surface of the first pipe section 31 and the arrangement of the nozzles 21 can be more clearly viewed. The end wall surface 31 is curved, so as to substantially correspond to the curvature of the inner surface of the conduit wall 104. Additionally, the nozzles 21 are arranged along a top part of the end wall surface, which extends above the filling opening 12, such that the entire width of the filling opening 12 can be covered with pressurized gaseous medium 22 from the nozzles 21. The arrangement of the nozzles 21 is further discussed in relation to FIGS. 3-4c.

The conduit is in the present examples of a round transverse cross-section, however it may take on other shapes as well. Accordingly, the end wall surface 31 is shaped to substantially correspond to curvature of the interior surface of the conduit wall 104.

Furthermore, in FIG. 2 the sampling cup 10 is positioned in a retracted position, and located inside the sampling apparatus 1. In this position, the sampling cup 10 cannot collect sample material from the product flow 100 but may instead be either stored until use or it may contain sampling material to be analyzed or displaced elsewhere via the sampling apparatus 1. For example, the sampling cup 10 may be arranged to be rotated about the longitudinal extent of the elongated arm 13, so that the contents of the sampling cup 10 may fall out and into a shaft 60.

In FIG. 2, a part of slide gate 50 is also visible. The slide gate 50 is arranged to move across the transverse extent of the interior pipe space 34 of the first pipe section 30, so as to physically separate the sampling cup 12, in the shown position, from the interior of the conduit 102. The slide gate 50 is preferably arranged so that it can extent across and cover an entire transverse cross-sectional extent of the interior pipe space 34. In the present examples, e.g., shown in FIG. 2, the slide gate 50 is arranged perpendicular to a longitudinal extent of the interior pipe space 34 of the first pipe section 30, but may alternatively also be angled. The slide gate 50 may be arranged to be displaceable between an open position and closed position along a horizontal line being perpendicular to the longitudinal extent of the interior pipe space 34, the longitudinal extent being arranged from the front end 33 to the back end of the first pipe section 32. The slide gate 50 may be introduced through the first pipe section 30 through a slit opening (not shown) accommodating the slide gate 50. The slide gate 50 is preferably an opaque structural element, such as a plate element.

FIGS. 1 and 2 also shows an analysis chamber 41 of an analysis system 40 being provided at a back end 32 of the first pipe section 30 being opposite to the front end 33 of the pipe section 30 arranged to be directed towards the conduit 102, when the sampling apparatus 1 is installed. The analysis chamber 41 is positioned such that the sampling cup 10 may be displaced through the interior pipe space 34 of the first pipe section 30 and to a retracted position, i.e., an analysis position, located inside the analysis chamber 41, e.g., the analysis chamber 41 may be fixed to a back end 32 of the first pipe section 30.

FIGS. 1 and 2 also shows a wall segment 52 of an extent arranged a distance along a side of the analysis chamber 41 and from the top of the analysis chamber 41. The wall segment 52 is an optional feature, and may be used to shield the sampling cup 10 in a retracted position, e.g., analysis position, from the product flow 100 in the conduit 102. The wall segment 52 can provide the shielding effect by being in a position between the sampling cup 10 and the conduit 102, e.g., at the back end 32 of the first pipe section 30. The wall segment 52 may be preferably be of a size allowing it to cover a back end aperture of the first pipe section. The wall segment 52 is preferably movably arranged between an open position (as shown in FIGS. 1 and 2) and a closed position between the sampling cup 10 and the conduit 102, in which the wall segment 52 provides the before mentioned shielding effect. The wall segment 52 may in the open position still be arranged in the analysis chamber 41, e.g. at the side of the sampling cup 10. In one or more examples, the wall segment 52 is fixed to the analysis system, preferably an interior surface of the analysis system 40, such as the hood 43 of the analysis system. The wall segment 52 may be arranged to be rotated at least a distance, e.g., at least 45 degrees, about a longitudinal axis arranged perpendicular to the horizontal plane, e.g. about an axis extending through a center of the hood 43. The hood 43 and the wall segment 52 is described further below in relation to FIG. 5.

Figure 3:
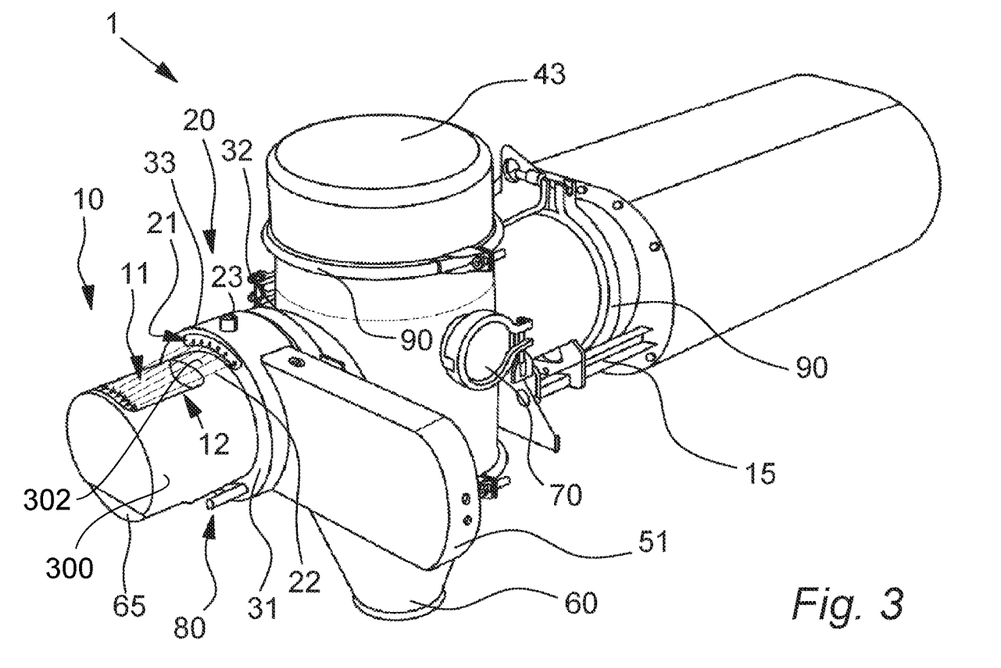
FIG. 3 shows the sampling apparatus of FIGS. 1-2 seen in perspective and with the sampling cup in an extracted position.

FIG. 3 shows the sampling apparatus 1 of FIGS. 1-2 seen in perspective and with the sampling cup 10 in an extracted position. Note that the filling opening 12 and the inner surface portion 304 move in unison from the retracted position shown in FIG. 2 to the extracted position of FIGS. 1 and 3. The sampling cup 10 is seen including a collection cavity 11 located below a filling opening 12, through which the collection cavity 11 can be accessed. The first pipe section 30 is shown arranged around the sampling cup 10 and further enclosing the movable arm on which the sampling cup 10 is attached (not shown). Nozzles 21 of the blow system 20 is seen arranged in the end wall surface 31 at the first front end 33 of the first pipe section 30. The nozzles are arranged along a curved line substantially corresponding the curvature of the filling opening 12. The curved line is of a width, which is equal or larger than the width of the filling opening, the width being the radial width of the cylindrical body in the present example. In FIG. 3, the nozzles 21 are arranged as pointed slightly downward towards the filling opening 12, so that pressurized gaseous medium exiting the nozzles are directed both across and downwards, as indicated by the arrows. The blow system 20 includes piping means to allow connection between the nozzles and a source of gaseous medium, e.g., air. In the present example, the gas source of the blow system 20 may be connected through a connection point 23 provided through the first pipe section 30, as shown in FIG. 3.

As shown in FIG. 1-3, the analysis system 40 includes a hood 43 arranged at the top of the analysis chamber 41, which may be connected to the analysis chamber 41 by removable fastenings 90, e.g., clamps, such that the analysis system 40 may be opened and the hood 43 be inspected. The hood 43 may include one or more instrument(s) 42 of the analysis system. Exemplary instruments (42a-e) are further described below in relation to FIG. 5. Removable fastenings 90, e.g., clamps, may also be provided between the shaft 60 and the analysis chamber 41 and/or between the first pipe section 30 and the analysis chamber 41 and/or between the housing 14 and the analysis chamber 41, so that the sampling apparatus 1 may be readily dismantled, e.g., for inspection and maintenance.

The housing 14 shown in FIGS. 1, 2 and 3 may enclose a weighing unit for weighing the content of the sampling cup 10, e.g., by a weight or load cell measuring the load in the sampling cup 10, e.g., by measuring the load on the elongated arm 13. The housing 14 may also be arranged to accommodate the elongated arm 13 in the retracted position(s) and drive means for driving the displacement of the elongated arm 13. Optionally, the housing 14 may be arranged with guided displacement means 15 e.g. on rod(s) or rail(s) or other displacement means, allowing a guided displacement of the housing 14 and the movable arm relative to the analysis system 40 and the first pipe section 30, so that the movable arm can be exposed, e.g., for inspection, etc. The sampling apparatus 1 may be made of stainless steel.

The sampling apparatus 1 may optionally also include a cleaner 80 as shown in FIGS. 1, 2 and 3. The cleaner 80 may be arranged at the bottom part of the end wall surface 31 of the first pipe section 30, as shown in FIG. 2. The cleaner 80 provides one or more elongated pipes directed inside the conduit 102 and arranged with an outlet 81 of the cleaning means 80 facing upwards towards the sampling cup 10, when the sampling cup 10 is in an extracted position inside the conduit 102. As shown in FIGS. 1 and 2, the pipes of the cleaner 80 are arranged through the first pipe section 30 and exiting at a lower exterior surface of the first pipe section 30, from where it may be connected to a suitable fluid and/or gas source. The cleaner 80 may be arranged to clean the collection cavity of the sampling cup 10, by spraying the interior surface thereof with gas and/or fluid, either through the filling opening 12 or through a bottom opening of the collection cavity 11, exposed by a movable door 65. The elongated arm 13 may be arranged to be rotatable about the longitudinal axis thereof, such that the filling opening 12 may be rotated, e.g., 180 degrees, so that it faces downwards towards the outlet(s) 81 of the cleaner 80. Alternatively or additionally, the sampling cup 10 may include a movable door 65, acting as a bottom side of the sampling cup 10, as shown in FIGS. 1, 2 and 3, which may be displaceable in a direction along a longitudinal axis of the elongated arm 13, so as to expose a bottom opening to the interior of the collection cavity 11 to the outlets 81 of the cleaner 80. The movable door 65 may also be used for emptying the content of the sampling cup either through the shaft 60 or in the conduit 102.

FIG. 3 also shows a casing 51 arranged to enclose the slide gate 50, as shown in FIG. 2. As shown in FIG. 3, the analysis chamber 41 may optionally be provided with a side opening 70, for discharge, e.g. by a suction device, of air, or steam, or the like, which may disrupt the analysis methods being undertaken in the analysis system 40.

The end wall surface 31 in FIG. 3 may be positioned outside the inner surface of the conduit 104, such that it does not protrude into the conduit 102 beyond the inner surface 104 or it may be configured to be substantially flush with the inner surface 104 of the conduit. In FIG. 3 the end wall surface 31 is of a shape configured to correspond to the neighboring planar conduit wall of the conduit containing the product flow, while the end wall surface 31 of FIGS. 1-2 is of a shape configured to correspond with the neighboring curved conduit wall 103 of a conduit 102 containing the product flow 100 to be sampled.

Figure 4A:
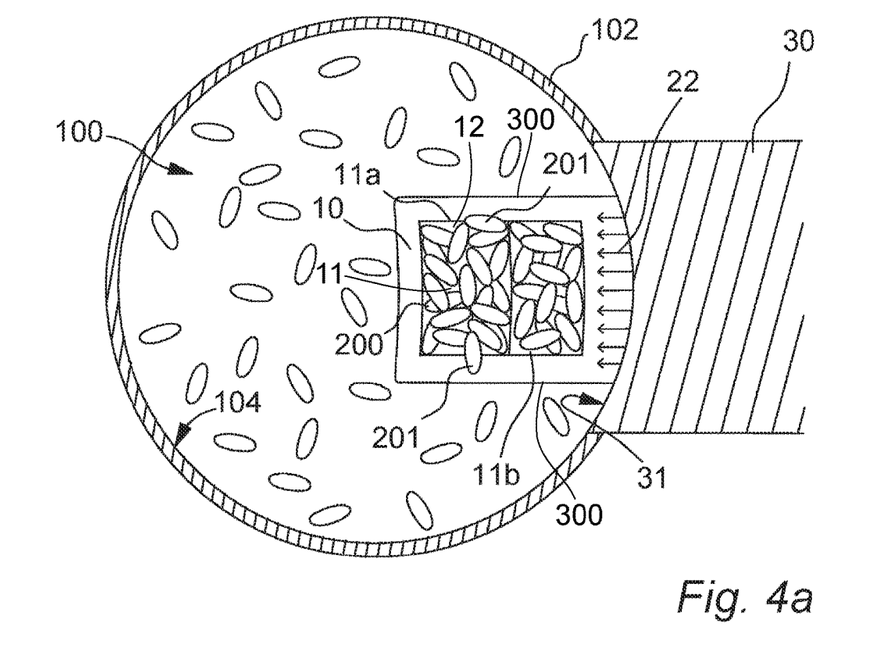
FIG. 4a shows a top view of the sampling apparatus and conduit as depicted in FIGS. 1-3.

FIG. 4a shows a top view at a position above the sampling cup 10 in an extracted position inside the conduit 102 containing a product flow 100. The view is directed parallel to the longitudinal extent of the conduit 102 and shows the product flow 100 contained in the conduit 102. The product flow 100 is falling through the conduit away from the point of view, due to the gravitational force. As an optional feature, the first pipe section 30 is shown installed through the conduit 102 with an end wall surface 31 being substantially flush with the inner wall surface 104 of the conduit. A sheet of pressurized gaseous medium 22, e.g., air, is shown directed towards the filling opening 12, and is arranged to extend across the entire extent of the filling opening 12, i.e., both length and width thereof. The arrows are indicating the flow direction.

Figure 4B:
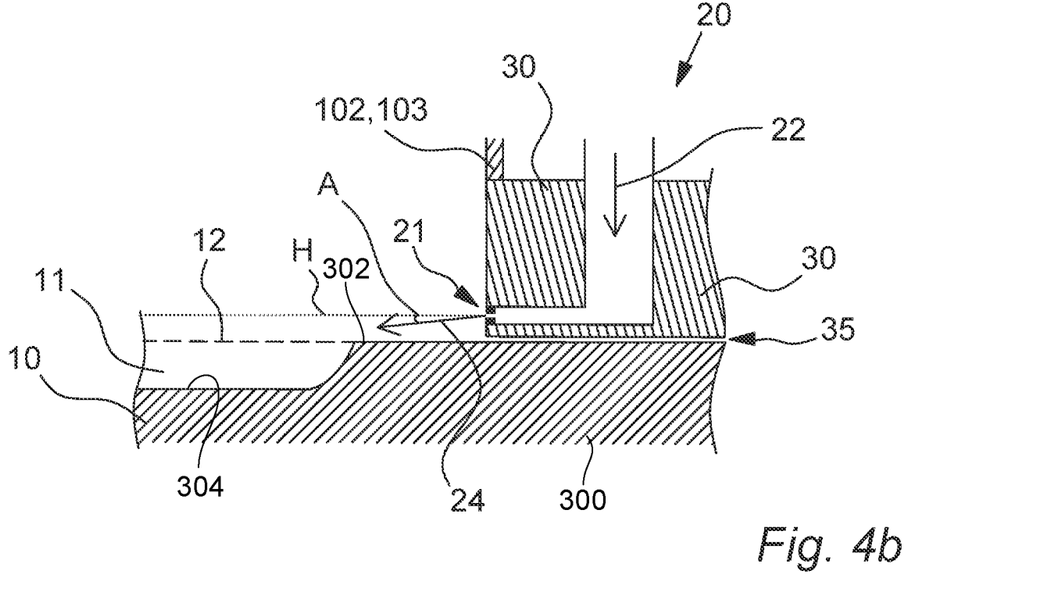
FIG. 4b shows a cross-sectional view of the sampling cup of the sampling apparatus of FIGS. 1-3 with nozzle(s) arranged at an angle.
Figure 4C:
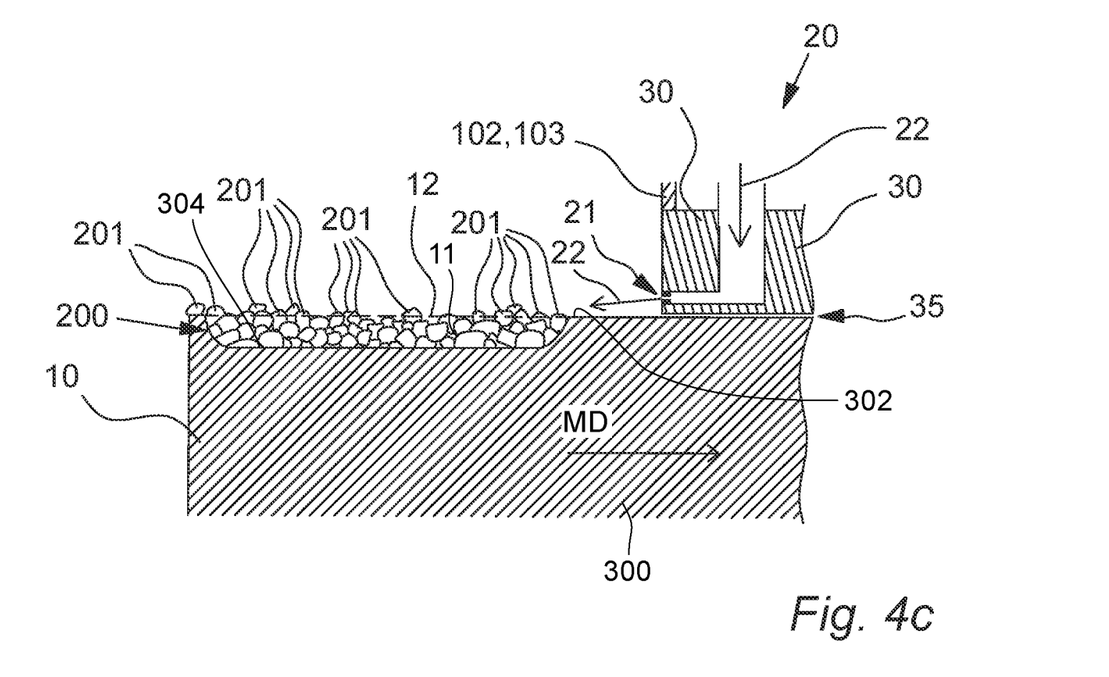
FIG. 4c shows a cross-sectional view of an embodiment of a sampling cup of the sampling apparatus of FIG. 4b containing sample material in accordance with the present invention.

The sheet of pressurized gaseous medium 22 is provided by nozzles (not shown in the present view) arranged in the end wall surface 31, which will be descried further in relation to FIG. 4b and 4c.

During use of the sampling apparatus 1, as shown in FIG. 4a, the sampling cup 10 is arranged in an extracted position, being a first position for collection of sample material 200. The sampling cup 10 is intersecting the product flow 100 and sample material 200, however typically also excess sample material 201 is collected, e.g., excess sample material 201 located on an edge of the sampling cup 10 and/or above the filling opening 12. The sheet of pressurized gaseous medium 22 is arranged to remove this excess material 201 by blowing it off the sampling cup 10 and back into the product flow 100. Optionally, and as shown in FIG. 4a, the sampling cup 10 may include two collection cavities, a first sampling cavity 11a and a second sampling cavity 11b.

In the present examples, the product flow 100 may contain a pellet of a size between 0.4 mm to 35 mm, e.g., on average about 30×30×20 mm in size (pet food) or pellets being on average about 0.6 mm in diameter and 0.6 mm in length (salmon feed).

The size of the sampling cup, the arrangement and/or size of the nozzle(s), the pressurization of the gaseous medium and/or the analysis instrument(s) of the analysis system may be configured for such pelletized sample(s).

FIG. 4b shows a cross-sectional view of the sampling cup 10 of the sampling apparatus 1 as shown in FIGS. 1-3 with nozzles 21 provided at an angle A. The sampling cup 10 is shown including a collection cavity 11 and a filling opening 12. As shown in FIG. 4b, the inner surface portion 304 of the body 300 of the sampling cup 10 faces the filling opening 12, where the collection cavity 11 is empty and the inner surface portion 304 is designed to receive the sample material. Furthermore, the first pipe section 30 is shown including a blow system 20 with the nozzles and pipes and a connection point 23 for connection to a suitable gaseous source, and, e.g., a compressor. The first pipe section 30 is installed through the conduit wall 103 of a conduit 102 for enclosing a product flow.

FIG. 4c shows a cross-sectional view of the sampling apparatus of FIG. 4b, after collection of sample material 200, 201 and prior to placing the sampling cup 10 in a retracted position, e.g., inside the sampling apparatus 1. As shown in FIG. 4c, the inner surface portion 304 of the body 300 of the sampling cup 10 faces the filling opening 12 and has the sample material 200, 201 supported thereon. Also, the filling opening 12 and the inner surface portion 304 move in unison from the extracted position shown in FIGS. 1, 3, 4a, and 4c to the retracted position. Sample material 200 is collected inside the sampling cup 10 and excess sample material 201 is located above the filling opening 12 and on top of the walls of the sampling cup 12, e.g., the curved upper surface of the cylindrical body. The sampling cup 10 is arranged to be movable at least along the moving direction MD indicated in FIG. 4c.

As can be seen in both FIG. 4b and 4c, a gap 35 is preferably provided between the sampling cup 10 and the first pipe section 30, in order to prevent any friction between them during any relative displacement. The height of the gap 35 may be a determining factor in the configuration of the blow system 20, e.g., the location and angle A of the nozzles 21, in that a larger gap allows more excess sample material 201 to be present above the filling opening 12 during retraction of the sampling cup 10. In one or more examples, the blow system 20 is configured to remove excess sample material 201, which extend to a height larger than the gap height measured between the sampling cup 10, e.g., the filling opening 12 and an outermost surface of the sampling cup 10, and an opposite facing interior surface of the first pipe section 30, during retraction of the sampling cup 10 through the first pipe section 30. However, preferably no excess sample material is extending above the filling opening 12 after it has been wiped by the gaseous medium 22 of the blow system 20.

The sampling apparatus of FIG. 4b, which is arranged with the movable arm arranged horizontally as is shown in FIG. 1-3, is arranged so that the nozzles 21 are pointing towards the filling opening 12 at angle A. In the present example, the angle A is measured from the line of direction 24 that the nozzles 21 are pointing in and the horizontal plane H. Due to this configuration, and as shown in FIG. 4c, when gaseous medium 22 is directed through the nozzles 21, a flow of gaseous medium 22 will generally follow the line of direction 24, as shown in FIG. 4b, and provide a flow of gaseous medium 22 across and towards the filling opening 12. By the angled arrangement of the nozzles 21 the sample material 200 in the collection cavity, which is mainly, preferably entirely, located below the filling opening 12, will be subjected to a downward directed force applied by the pressurized gaseous medium 22, which thereby will aid in maintaining the sample material 200 inside the sampling cup 10.

By the blow system 20 of the present examples, in particular with the nozzles 21 and their angled arrangement, as shown in FIG. 4a and 4b, the pressurized gaseous medium 22 can interact with the excess sample material 201 extending above the filling opening 12 so that it is moved away from the filling opening 12 and the sampling cup 10. Also, the excess sample material 201 located on the cylindrical body surface can be blown away. Consequently, upon subsequent displacement of the sampling cup 10 in the moving direction MD, and relative to the first pipe section 30, no excess sample material 201 will be present to get stuck between the sampling cup 10 and the first pipe section 30, e.g., in the gap 35.

In one or more examples, the blow system 20 is appropriately synchronized with the displacement of the sampling cup 10 from extracted to retracted positions, e.g., the blow system 20 may be activated prior to or during the retraction of the sampling cup 10, preferably automatically. The sampling apparatus 1 of the present examples may be arranged to provide automatic and continuous sampling of the sample material, e.g., for bulk density analysis provided by the analysis system 40 of the sampling apparatus 1.

FIG. 5 show an example of instruments 42 of the analysis system 40. The instruments 42 may be arranged under the hood 43 shown in FIGS. 1-3 and the wall segment 53 may be rotatably arranged below the instruments, without interfering with the working area of the instruments 42. In the example shown in FIG. 5 the instruments 42 include a vision camera 42a, a fill level sensor 42b, a temperature sensor (sensor device 42b or 42e), two fans (aeration device 42c), and four UVC lights (UV radiation unit 42d).

| REFERENCE LIST | |
|---|---|
| 1 | Sampling apparatus |
| 10 | Sampling cup |
| 11 | Collection cavity |
| 11a | First sampling cavity |
| 11b | Second sampling cavity |
| 12 | Filling opening |
| 13 | Elongated arm |
| 14 | Housing |
| 15 | Guided displacement means |
| 20 | Blow system |
| 21 | Nozzle(s) |
| 22 | Pressurized gaseous medium |
| 23 | Connection point |
| 24 | Line of direction (of the nozzle(s)) |
| 30 | First pipe section |
| 31 | End wall surface (of the first pipe section) |
| 32 | Back end (of first pipe section) |
| 33 | Front end (of first pipe section) |
| 34 | Interior space (of the first pipe section) |
| 35 | Gap |
| 40 | Analysis system |
| 41 | Analysis chamber |
| 42 | Instrument(s) (of the analysis system) |
| 42a | Scanning device, e.g. a vision camera |
| 42b | Sensor device, e.g. a fill level sensor |
| 42c | Aeration device, e.g. fan(s) |
| 42d | UV-radiation unit |
| 42e | Sensor device, e.g. a temperature sensor |
| 43 | Hood |
| 50 | Slide gate |
| 51 | Casing |
| 52 | Wall segment |
| 60 | Shaft |
| 65 | Movable door |
| 70 | Side opening |
| 80 | Cleaning means |
| 81 | Outlet (of the cleaning means) |
| 90 | Fastening means, e.g. ring clamp |
| 100 | Product flow |
| 101 | Main flow direction |
| 102 | Conduit |
| 103 | Conduit wall |
| 104 | Interior surface (of conduit wall) |
| 200 | Sample material |

| REFERENCE LIST | |
|---|---|
| 201 | Excess sample material |
| A | Angle of nozzle(s) |
| H | Horizontal plane |

The invention claimed is:

1. A sampling apparatus for sampling from a product flow, wherein the sampling apparatus comprises:
a sampling cup comprising a collection cavity having a filling opening of an extent allowing for sample material to be collected from a product flow and into the collection cavity, wherein the sampling cup is arranged to contain and store a volume of the sample material inside the collection cavity;
wherein the sampling cup comprising the collection cavity and the filling opening is movably arranged between an extracted position and a retracted position by an actuator system, wherein the extracted position comprises a first position for allowing the sampling cup to intersect the product flow;
wherein the sampling cup comprises a body that defines the collection cavity, wherein a first side of the body defines the filling opening that allows the sample material to be collected within the collection cavity upon an inner surface portion of the body that faces the filling opening, wherein the filling opening and the inner surface portion move in unison at all times; and
wherein the sampling apparatus further comprises a blow system comprising one or more nozzles arranged to direct a pressurized gaseous medium across the filling opening so as to remove excess sample material extending above the filling opening, while the sampling cup is located in the extracted position.

2. The sampling apparatus according to claim 1, wherein the blow system is arranged to remove excess sampling material while the sampling cup is moved in a direction from the extracted position to the retracted position, wherein in the retracted position at least part of the filling opening is shielded from the product flow.

3. The sampling apparatus according to claim 1, wherein the one or more nozzles of the blow system are configured to provide the pressurized gaseous medium as a sheet of gaseous medium extending across the filling opening.

4. The sampling apparatus according to claim 3, further comprising a pipe section arranged to be installed through a conduit wall of a conduit including the product flow, and wherein the pipe section comprises the one or more nozzles arranged in an end wall surface thereof.

5. The sampling apparatus according to claim 4, wherein the sampling apparatus is configured to be installed so that the end wall surface is not extending beyond an interior wall surface of the conduit.

6. The sampling apparatus according to claim 5, wherein the sampling apparatus is configured to be installed so that the end wall surface is substantially flush with the interior wall surface of a conduit wall adjacent to the end wall surface.

7. The sampling apparatus according to claim 5, wherein the end wall surface is curved.

8. The sampling apparatus according to claim 4, wherein the sampling apparatus comprises a gate device comprising a slide gate with a major extent thereof arranged perpendicular to a longitudinal extent of an interior pipe space of the pipe section, and wherein the slide gate is arranged to be displaceable between an open position and closed position, wherein in the closed position the slide gate is arranged to close the interior pipe space by extending across a transverse extent of the interior pipe space of the pipe section.

9. The sampling apparatus according to claim 4, wherein the sampling apparatus comprises a shaft for receiving sample material from the collection cavity, wherein the shaft is arranged externally to the conduit including the product flow.

10. The sampling apparatus according to claim 1, wherein the blow system is arranged to direct the pressurized gaseous medium across the filling opening and into the collection cavity at an angle of between 3 and 20 degrees, wherein the angle is measured relative to the filling opening.

11. The sampling apparatus according to claim 1, wherein the sampling cup is arranged on an elongated arm of the actuator system, wherein the elongated arm is configured to be displaceable along a longitudinal direction thereof, so that the sampling cup can be displaced between the extracted position and the retracted position, and
wherein the retracted position comprises an analysis position, which is located within an analysis chamber of an analysis system included by the sampling apparatus and configured to determine a material property of the sample material in the sampling cup.

12. The sampling apparatus according to claim 11, wherein the material property is bulk density of the sample material.

13. The sampling apparatus according to claim 12, wherein the analysis system comprises one or more of the following instruments:
a scanning device;
a sensor device;
an ultra-violet (UV) radiation unit; and
a weighing unit for weighing the content of the collection cavity.

14. The sampling apparatus according to claim 11, wherein the analysis chamber is provided externally to the product flow.

15. The sampling apparatus according to claim 11, wherein the analysis system comprises one or more of the following instruments:
a scanning device;
a sensor device;
an ultra-violet (UV) radiation unit; and
a weighing unit for weighing the content of the collection cavity.

16. The sampling apparatus according to claim 11, wherein one or more instruments of the analysis system are arranged to be located above the sampling cup, when the sampling cup is in the analysis position, and
wherein the analysis system comprises a wall segment movably fixed to an interior surface of the analysis chamber, such that the wall segment is arranged to at least partly shield a measuring space extending between the sampling cup and the one or more instruments.

17. The sampling apparatus according to claim 16, wherein the wall segment is configured to be movable about the measuring space along a distance corresponding to an angle of at least 75 degrees from a closed position in which the wall segment provides a shield between the product flow and the sampling cup.

18. The sampling apparatus according to claim 1, wherein the collection cavity includes two discrete sampling cavities, such that two separate portions of sample material may be collected simultaneously.

19. The sampling apparatus according to claim 1, wherein the sampling apparatus comprises a control system for controlling the blow system and displacement of the movably arranged sampling cup between the extracted position and the retracted position, such that upon receiving an activation input, the control system is arranged to execute a sampling process comprising:
   providing the sampling cup in the extracted position;
   initiating a wipe off process by the blow system so as to remove excess sample material located above the filling opening; and
   providing the sampling cup in the retracted position.

20. The sampling apparatus according to claim 1, wherein the control system is arranged to control the sampling apparatus, such that the sampling process is executed periodically.

21. A method of use of a sampling apparatus for collection of sample material from a product flow, wherein the sampling apparatus comprises:
   a sampling cup comprising a collection cavity having a filling opening of an extent allowing for sample material to be collected from a product flow and into the collection cavity, wherein the sampling cup is arranged to contain and store a volume of the sample material inside the collection cavity;
   wherein the sampling cup comprising the collection cavity and the filling opening is movably arranged between an extracted position and a retracted position by an actuator system, wherein the extracted position comprises a first position for allowing the sampling cup to intersect the product flow;
   wherein the sampling cup comprises a body that defines the collection cavity, wherein a first side of the body defines the filling opening that allows the sample material to be collected within the collection cavity upon an inner surface portion of the body that faces the filling opening, wherein the filling opening and the inner surface portion move in unison at all times; and
   wherein the sampling apparatus further comprises a blow system comprising one or more nozzles arranged to direct a pressurized gaseous medium across the filling opening so as to remove excess sample material extending above the filling opening, while the sampling cup is located in the extracted position; wherein the method comprises:
   having the product flow provide a food product, wherein the product flow comprises material arranged to provide the food product after undergoing at least an extrusion process, drying process and cooling process, and
   having the sampling apparatus collect a sample material from the product flow prior to the extrusion process, prior to the drying process and/or prior or post to the cooling process.

22. A method of use of a sampling apparatus for collection of a sample material from a product flow, the method comprising: collecting a sample material from a product flow into a collection cavity of a sample cup, wherein the collection cavity has a filling opening and wherein the sample material is a pelletized sample material of a size having the largest dimension of a length of in the range of 0.4 mm to 35 mm, wherein the sampling cup is arranged to contain and store a volume of the sample material inside the collection cavity; movably arranging the sampling cup comprising the collection cavity and the filling opening between an extracted position and a retracted position by an actuator system, wherein the extracted position comprises a first position for allowing the sampling cup to intersect the product flow; directing pressurized gaseous medium across the filling opening so as to remove excess sample material extending above the filling opening, while the sampling cup is located in the extracted position; wherein the sampling apparatus comprises: a sampling cup comprising a collection cavity having a filling opening of an extent allowing for sample material to be collected from a product flow and into the collection cavity; wherein the sampling cup is movably arranged between an extracted position and a retracted position by an actuator system, wherein the extracted position comprises a first position for allowing the sampling cup to intersect the product flow; wherein the sampling cup comprises a body that defines the collection cavity, wherein a first side of the body defines the filling opening that allows the sample material to be collected within the collection cavity upon an inner surface portion of the body that faces the filling opening, wherein the filling opening and the inner surface portion move in unison at all times; and wherein the sampling apparatus further comprises a blow system comprising one or more nozzles arranged to direct a pressurized gaseous medium across the filling opening so as to remove excess sample material extending above the filling opening, while the sampling cup is located in the extracted position.

* * * * *